Jan. 18, 1927.　　　　　　　　　　　　　　　　1,614,511
C. P. WICKS
SWITCH MECHANISM FOR AUTOMOBILE SIGNALS
Filed April 4, 1922　　　　3 Sheets-Sheet 3
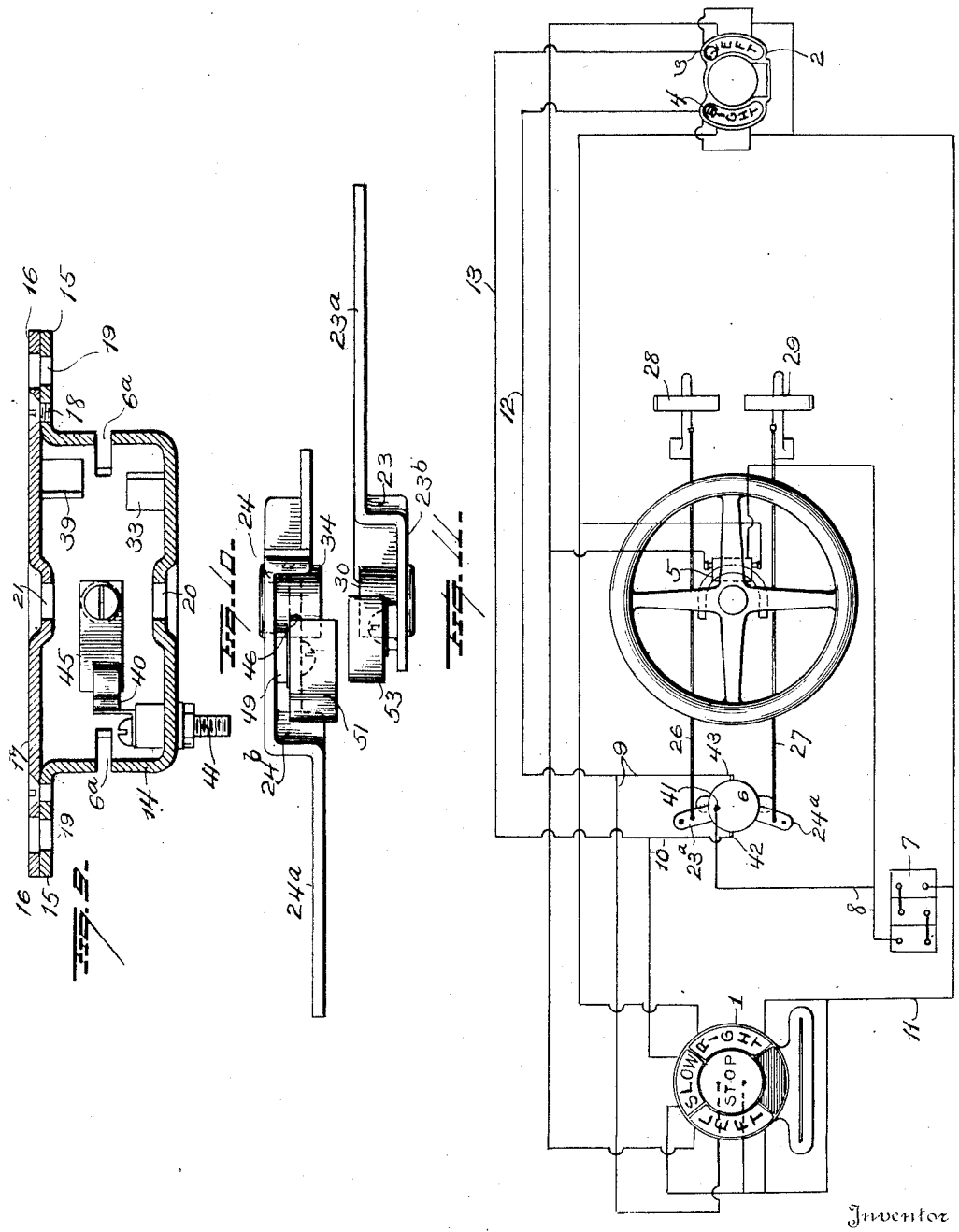
Inventor
C. P. Wicks
By Seymour & Bright
Attorneys Patented Jan. 18, 1927.

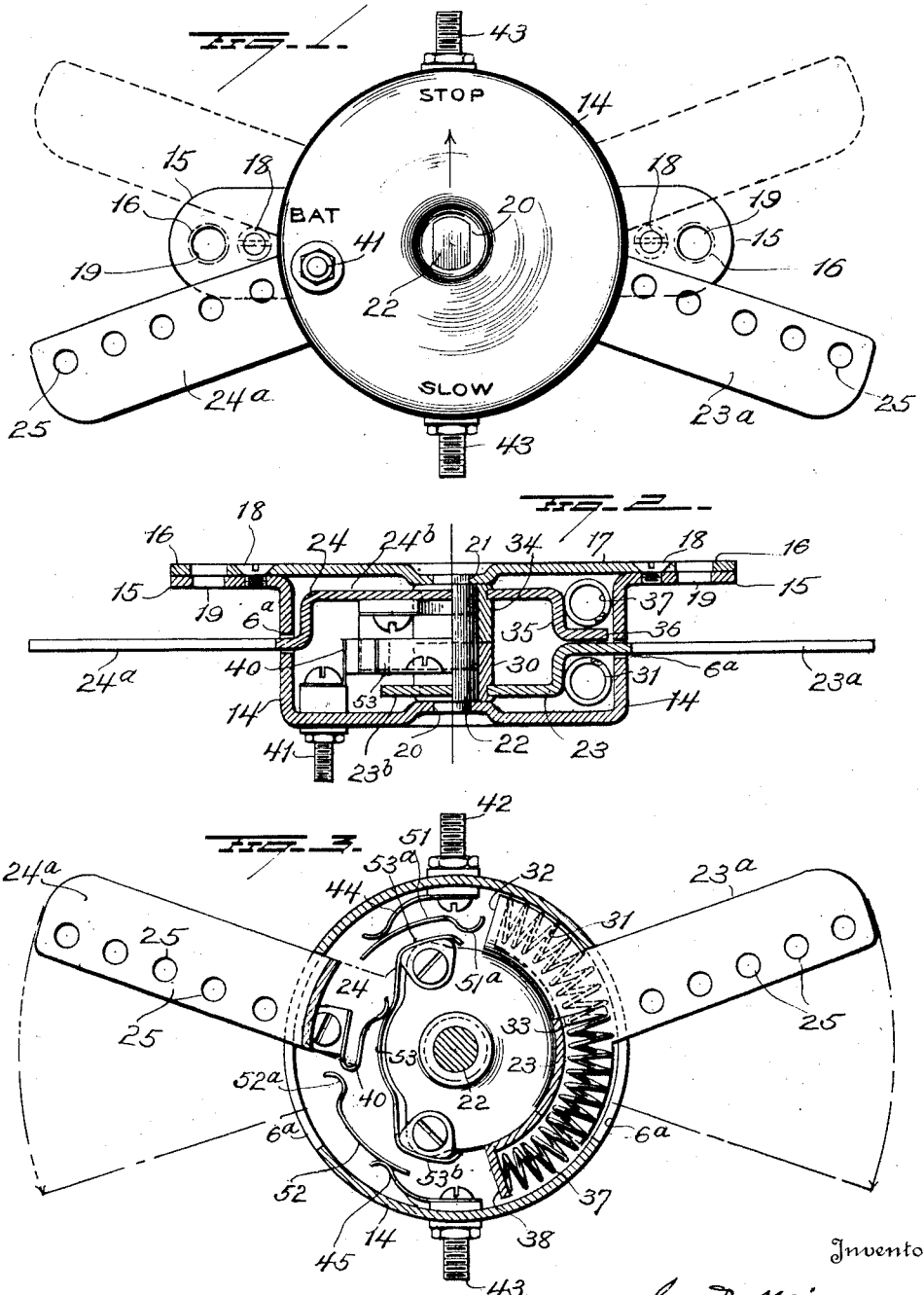

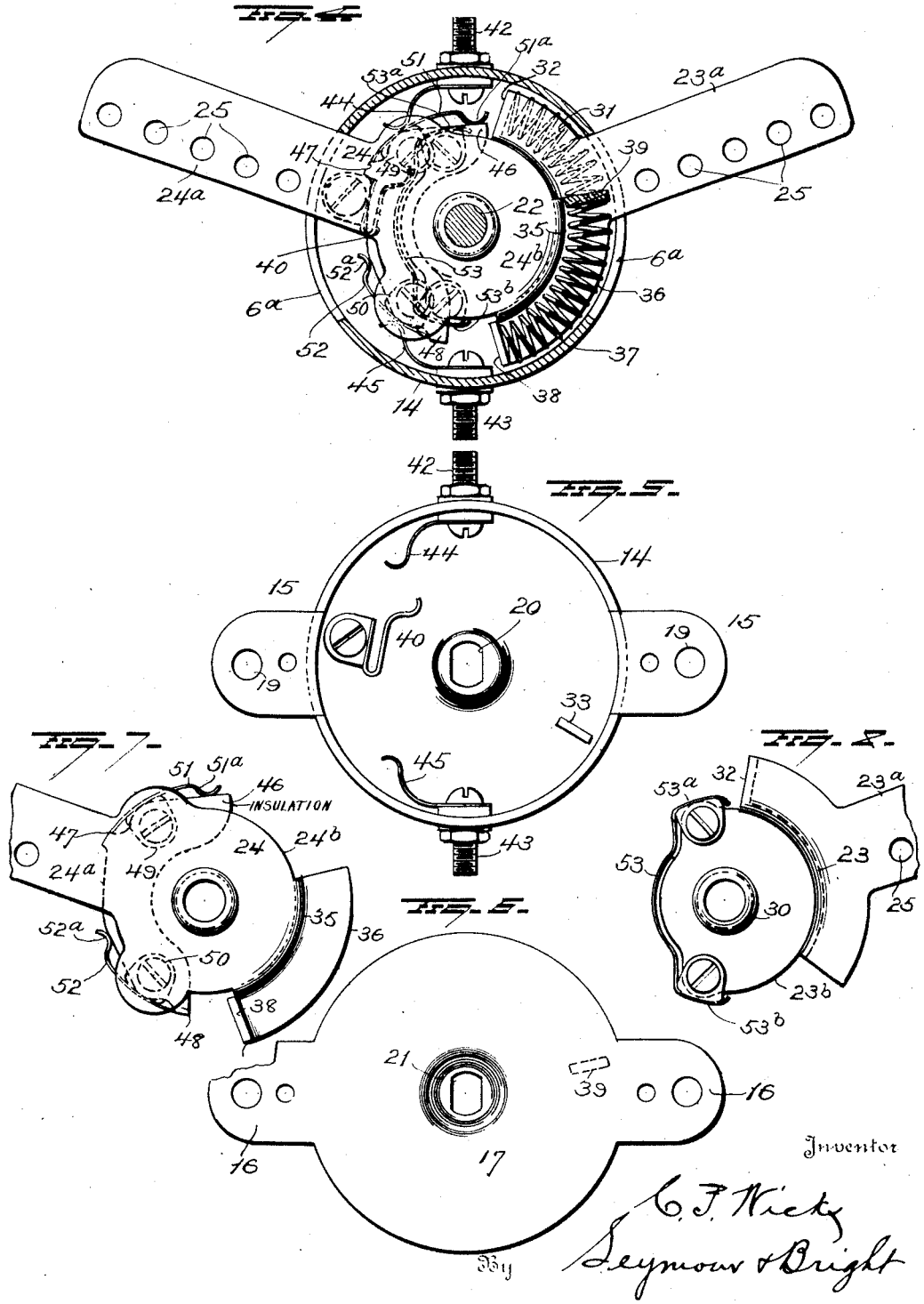

1,614,511

UNITED STATES PATENT OFFICE.

CLIFFORD PROVOST WICKS, OF STAMFORD, CONNECTICUT.

SWITCH MECHANISM FOR AUTOMOBILE SIGNALS.

Application filed April 4, 1922. Serial No. 549,614.

This invention relates to improvements in signaling means for automobiles and more particularly to switch mechanism for controlling the operation of the "slow" and "stop" signals—one object of the invention being to provide simple and efficient switch means which shall be operable automatically upon manipulation of the clutch and brake pedals of the automobile to control the lighting and extinguishing of the lamps of said signals.

A further object is to so construct switch mechanism controllable by the operation of the clutch and brake of an automobile that when either of said pedals is depressed either partly or entirely, or when both are depressed less than one-half the throw, only the "slow" signal will be illuminated; but so that when both pedals are depressed more than half their throw, the lamp of the "slow" signal will be extinguished and the "stop" signal illuminated, whereby the flashing of a brilliant "stop" signal in the face of the operator of a following car at every manipulation of either pedal, will be avoided.

With these and other objects in view, the invention consists in certain novel features of construction and combinations of parts as hereinafter set forth and pointed out in the claims.

In the accompanying drawings; Figure 1 is a face view of a "speed" switch embodying my improvements; Figure 2 is a transverse sectional view; Figure 3 is a horizontal sectional view; Figure 4 is a view showing the casing in horizontal section and the mechanism in elevation; Figure 5 is a view showing the casing, with the cover removed, and the stationary contact fingers; Figure 6 is a face view of the casing cover; Figures 7 and 8 are face views showing the operating levers; Figure 9 is a transverse sectional view showing the casing and two of the stationary contact fingers therein; Figure 10 shows the operating levers in side elevation, and Figure 11 is a diagrammatical view illustrating the installation of my improvements.

In the diagrammatical view, Figure 11, I have illustrated a rear signal 1 to be illuminated by incandescent electric lamps (not shown), and embodying direction signals "right" and "left" and speed signals "slow" and "stop". A front signal 2 is also shown and this may be provided with direction signals "right" and "left" to be illuminated by incandescent electric lamps, and said front signal may be provided with rear colored lenses 3, 4, to be illuminated by separate incandescent lamps (not shown) included in circuit with the lamps of the rear "slow" and "stop" signals respectively. A switch mechanism is shown at 6 for controlling the illuminating of the "speed" signals. A battery is illustrated at 7 (Fig. 11) and the positive pole of this battery is connected with a contact finger within the casing of switch 6 (as hereinafter explained) by a conductor 8, and other contact fingers within the switch casing are connected by conductors 9, 10 with one terminal of the lamps for the "slow" and "stop" rear signals, the other terminals of these lamps being connected with a return conductor 11. The lamps in the front signal which illuminate the back lenses 4, 3 to denote the operative condition of the rear "slow" and "stop" signals, are connected with the conductors 9 and 10 by conductors 12 and 13 respectively and with the return conductor 11.

The "speed" switch 6 includes a casing 14 provided with diametrically opposite ears 15 to which ears 16 on a cover 17 are secured by means of screws 18, and said ears 15—16 are provided with aligning holes 19 for the accommodation of bolts whereby the switch may be secured to a part of the automobile structure. The casing and its cover are provided with axially alined bearings 20, 21 for the end portions of a transversely disposed fulcrum pin 22 on which levers 23 and 24 are pivotally mounted. The outwardly projecting arms 23ª and 24ª of the respective levers pass through elongated slots 6ª in the casing 14 and are made each with a series of perforations 25 for the adjustable connection of flexible cables 26, 27 respectively and these cables are connected respectively with the clutch and brake pedals 28—29 of the automobile. It may be here stated that either of the switch levers may be connected with either of the pedals, but for convenience of this description, it is assumed that the arm of the lever 23 is connected with the clutch pedal 28 and that the arm of lever 24 is connected with the brake pedal 29. The end portion of the switch lever 23 is offset, forming a disk portion 23ᵇ provided with a hub 30 mounted on the fulcrum pin 22. The offsetting of the inner portion of the lever 23 provides a pocket for a spring 31, one end of which latter bears against a flange 32 forming one end of said pocket and the other end of said spring bears against a lug 33 on the casing. The lever 24 is also offset as at 24$^b$ within the casing 14 so as to overlie (but spaced from) the offset portion of th lever 23 and is provided with a hub 34 mounted on the fulcrum pin 22. The offset portion 24$^b$ of the lever 24 is provided with flanges 35—36 whereby a pocket is formed to receive a spring 37 disposed parallel with the spring 31, and one end of said spring 37 bears against a flange 38 at one end of said pocket, while its other end bears against a lug 39 on the cover 17.

A stationary spring contact finger 40 is located in and electrically insulated from the casing, 14, said contact finger being electrically connected with a binding post 41 with which the leading-in conductor 8 is connected. Diametrically opposite binding posts 42 and 43 are secured to but insulated from the casing 14 and with these binding posts, stationary spring contact fingers 44 and 45 are electrically connected and insulated from the casing. The conductor 10 is connected with the binding post 42 and the conductor 9 is connected with the binding post 43.

To the switch lever 24, an insulating separator plate 46 is secured and provided with lugs 47 and 48. The ears 49, 50 of spring contact fingers 51, 52 are secured to the insulating plate 46 and the butt ends of these fingers rest on the lugs 47, 48, while their bent ends 51$^a$, 52$^a$ rest on the edge of said plate, and thus the contact fingers 51, 52 are prevented from turning on their connections with the plate 46 and the end portions 51$^a$ and 52$^a$ are prevented from moving too far inwardly. It will be observed that the stationary contact fingers 44, 45 are in constant electrical engagement with the fingers 51 and 52 (see Figs. 3 and 4).

The lever 23 carries, at the forward edge of its offset portion 23$^b$, a contact strip 53 which is insulated from the lever and is formed to provide shoulder portions 53$^a$ and 53$^b$ at its respective ends, and the stationary contact finger 40 engages this strip.

In Figure 3 of the drawings, the switch is shown with the movable parts in neutral positions and positions which the switch levers may be caused to assume are indicated by dotted lines in this figure as well as in Figure 1.

The mechanism may be operated as follows:—

Movement of either switch lever 23 or 24 or both of said levers will cause the portion 53$^a$ of the contact strip 53 on lever 23 to make electrical contact with the finger 51 and the latter being in contact with the finger 44, and the finger 40 being in contact with the conductor strip 53, a circuit will be closed to light the lamp of the "slow" signal. This circuit will remain closed during movement of one or both of the switch levers until the shoulder portion 53$^a$ of strip 53 shall have passed the portion 51$^a$ of the finger 51 when the circuit of the "slow" signal lamp will be opened and the lamp extinguished. The switch lever movement necessary to cause the lighting and subsequent extinguishing of the lamp of the "slow" signal, is equal approximately to the full throw of one switch lever, or approximately one-half throw of both switch levers when operated simultaneously. A continued movement of either or both of the switch levers beyond the distance required to open the circuit of the "slow" signal lamp, will cause the portion 53$^b$ of contact strip 53 on lever 23 to contact with the portion 52$^a$ of finger 52, thus closing the circuit of the lamp of the "stop" signal.

From the above, it will be seen that one of the signals will be operated upon the full movement of either the brake or the clutch pedal, or a partial movement of the two pedals simultaneously; that the operation of one signal may be caused to cease and the other to commence when the combined motion of the two switch levers exceeds a predetermined extent of throw. It will also be observed that neither signal will be operated until sufficient movement of one or both switch levers shall have been accomplished to cause electrical connection of the strip 53 with one of the fingers 51, 52. It may be here stated that one feature of my improvements is to operate no signal until the predetermined point is reached, and then to commence and continue the operation of one signal. My improvements are therefore adaptable for use with the present type of "stop" signals, having one indication only, to avoid the constant flashing of the brilliant "stop" signal.

With my improvements, the "slow" and "stop" signals are operated entirely automatically by the switch 6, the same being connected with both the clutch and the brake pedals. When either of these pedals is depressed either partly or entirely, or when both are depressed less than one-half their throw, only the "slow" signal will be illuminated; but immediately upon both pedals being depressed more than one-half their throw, the "slow" signal lamp will be extinguished, and the "stop" signal illuminated.

Various changes might be made in the details of construction of my invention without departing from the spirit thereof or limiting its scope and hence I do not wish to restrict myself to the precise details herein set forth.

Having fully described my invention what

I claim as new and desire to secure by Letters-Patent, is:—

1. A switch including stationary contacts, two movable switch members, a plurality of contacts carried by one movable switch member cooperable with two of the stationary contacts, and a contact carried by the other movable switch member cooperable with another stationary contact and with the contacts carried by the first-mentioned movable switch member.

2. In a switch of the character described, the combination with a frame or casing and a plurality of stationary contacts thereon, of two movable switch members, each manually operable independently of the other, and contacts carried by the respective switch members and each in constant engagement with a stationary contact and arranged to engage a contact on the opposed movable member.

3. In a switch of the character described, the combination with a frame or casing and a plurality of stationary contacts thereon, of two movable switch members, each manually operable independently of the other, contacts carried by the respective switch members and each cooperable with a contact on the other switch member and with one of the stationary contacts, and means housed in the casing and acting on the respective movable switch members to hold each of them yieldably in neutral position with the contacts thereon out of engagement.

4. In a switch of the character described, the combination with a frame or casing, and three stationary spring contact fingers secured thereto, of two independently movable switch members, two contact fingers carried by one of said switch members and cooperable respectively with two of the stationary contact fingers, and a single contact device carried by the other movable switch member and cooperable with each of the contact fingers of the first-mentioned switch member and with the third stationary contact finger.

5. In a switch of the character described, the combination with a frame or casing, and three stationary contact fingers, of two independently movable switch members, an insulating piece carried by one of said switch members, two contact fingers each secured between its ends to said insulating piece and bearing at its ends against the latter, said contact fingers being cooperable with two of the stationary contact fingers, and a contact piece carried by the other movable switch member and cooperable with the third stationary contact finger and with the contact fingers carried by the insulating piece secured to the first-mentioned movable switch member.

6. In a switch of the character described, the combination with a casing, and a plurality of stationary contacts, of two switch levers having a common pivot axis in said casing, a spring interposed between an intermediate portion of one of said levers and the casing, a spring interposed between the end portion of the other lever and the casing, contacts carried by one of said switch levers and cooperable respectively with two of the stationary contacts, and a contact carried by the other switch lever and cooperable with another stationary contact and with the contacts carried by the first-mentioned switch lever.

In testimony whereof, I have signed this specification.

CLIFFORD PROVOST WICKS.